United States Patent

Piasecki et al.

[11] Patent Number: 6,083,465
[45] Date of Patent: Jul. 4, 2000

[54] METHOD AND APPARATUS FOR CONTINUOUSLY CALCINING GYPSUM

[75] Inventors: Robert J. Piasecki, Charlotte, N.C.; Larry W. Kingston, North Tonawanda, N.Y.

[73] Assignee: National Gypsum Properties, LLC, Charlotte, N.C.

[21] Appl. No.: 09/266,560

[22] Filed: Mar. 11, 1999

[51] Int. Cl.[7] .............................. C04B 11/02; C04B 2/10; B01J 8/08; B01D 11/02
[52] U.S. Cl. .......................... 423/171; 423/170; 423/172; 422/233; 422/276; 106/772
[58] Field of Search .................... 423/171, 172, 423/555, 170; 422/233, 273; 106/772

[56] References Cited

U.S. PATENT DOCUMENTS

| | | | |
|---|---|---|---|
| 4,080,422 | 3/1978 | McClearly | 423/172 |
| 4,502,901 | 3/1985 | Burkard | 156/39 |

OTHER PUBLICATIONS

Kirk–Othmer, Encyclopedia of Chemical Technology, Fourth Edition, vol. 4, pp. 812–826, 1992.

*Primary Examiner*—Steven P. Griffin
*Assistant Examiner*—Maribel Medina
*Attorney, Agent, or Firm*—Marshall, O'Toole, Gerstein, Murray & Borun

[57] ABSTRACT

An apparatus for continuously calcining gypsum includes a flash calcining impact mill, a feed bin adjacent the impact mill for holding gypsum, and a gypsum feed control mechanism for supplying gypsum from the feed bin to the impact mill at a substantially constant rate. A method for continuously producing calcined gypsum includes the steps of providing a flash calcining impact mill and providing a feed bin adjacent the impact mill, the feed bin containing gypsum to be calcined. A gypsum feed control mechanism is provided for supplying gypsum from the feed bin to the impact mill. Gypsum is supplied from the feed bin to the impact mill at a substantially constant rate, and the impact mill is operated to dry, grind, and calcine the gypsum.

15 Claims, 1 Drawing Sheet

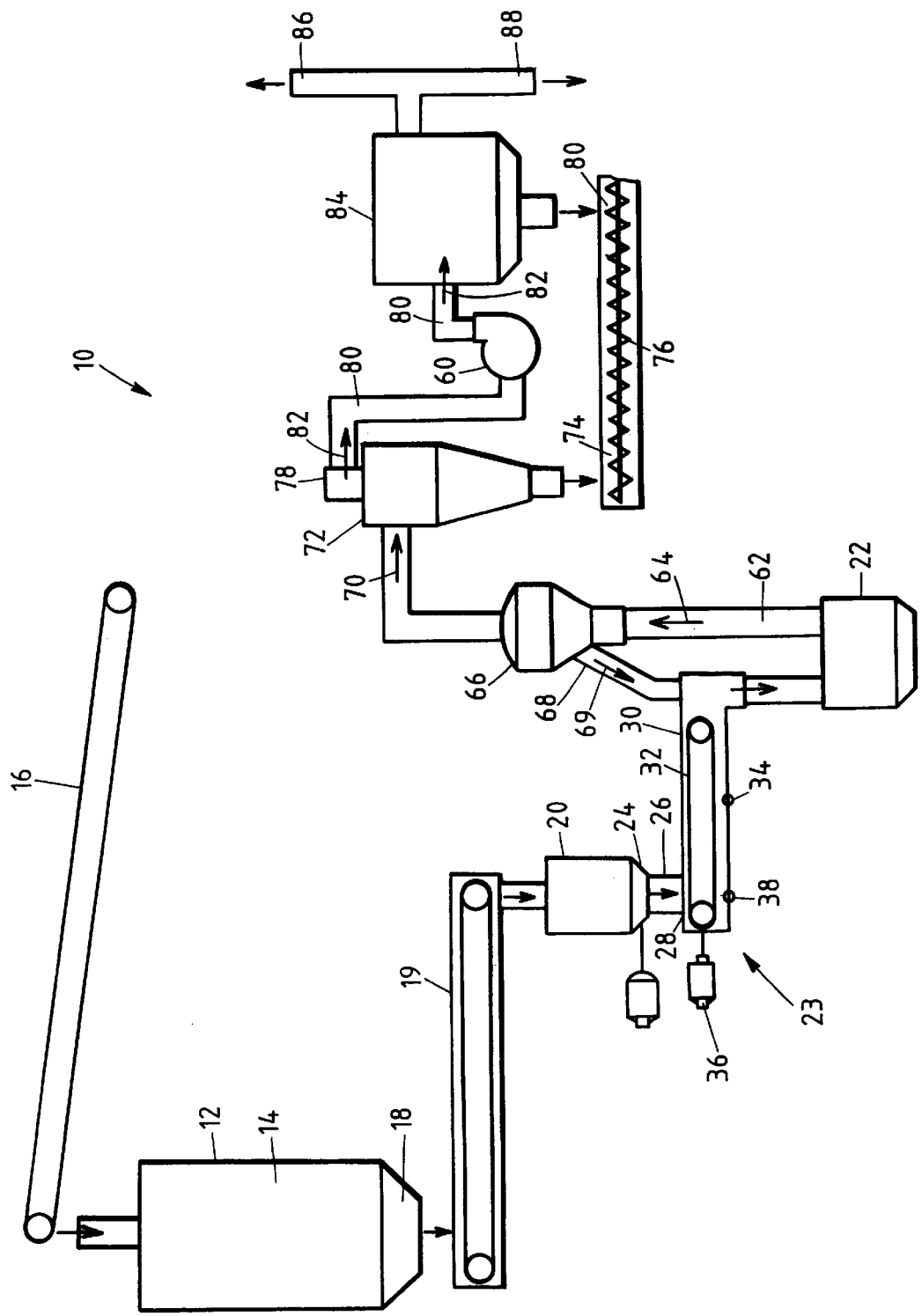

METHOD AND APPARATUS FOR CONTINUOUSLY CALCINING GYPSUM

BACKGROUND OF THE INVENTION

1. Field of the Invention

The present invention relates generally to methods and apparatus for calcining gypsum, and in particular to methods and apparatus for continuously calcining natural gypsum, synthetic gypsum, or combinations of natural and synthetic gypsum.

2. Description of Related Technology

Calcium sulfate ($CaSO_4$) exists in the following forms, which differ based on the amount of water bonded to the calcium sulfate: anhydrite (soluble or insoluble) ($CaSO_4$), also referred to as anhydrous calcium sulfate; calcium sulfate hemihydrate, ($CaSO_4 \cdot \frac{1}{2}H_2O$), known as stucco, calcined gypsum, or Plaster of Paris; and calcium sulfate dihydrate ($CaSO_4 \cdot 2H_2O$), known as gypsum. Gypsum is found in natural gypsum rock and may also be synthetically produced. The properties of calcium sulfate are described in more detail in 4 Kirk-Othmer Encyclopedia of Chemical Technology 812 (4th ed. 1992), the disclosure of which is hereby incorporated by reference.

Synthetic gypsum, also known as by-product gypsum, is typically produced as a by-product in various chemical processes. For example, flue gas desulfurization (FGD) gypsum is a by-product of stack gas scrubbing processes; titanogypsum is produced by neutralizing waste sulfuric acid from the sulfate process used to manufacture titanium oxide pigment; phosphogypsum is a by-product produced when phosphate ore is acidulated to extract phosphoric acid; fluorogypsum is a by-product of the fluorspar acidulation reaction used to produce hydrofluoric acid; citrogypsum is a by-product of a process for producing citric acid; and borogypsum is a by-product of a process for producing boric acid. Synthetic gypsum typically includes more free water (water not bound to calcium sulfate) than natural gypsum. Natural gypsum typically includes about 1%–3% free water (unless otherwise indicated, percentages herein indicate percent by weight), compared to synthetic gypsum which is typically mechanically de-watered to a slurry containing about 6%–12% free water. Synthetic gypsum also has a sand-like, granular consistency, compared to natural gypsum which is broken into large rocks during mining. Stucco is produced by drying, grinding, and calcining natural gypsum or synthetic gypsum. Drying refers to removal of free water. Calcination refers to the conversion of calcium sulfate dehydrate to calcium sulfate hemihydrate, according to the following chemical reaction:

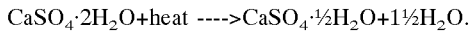
$CaSO_4 \cdot 2H_2O + \text{heat} \longrightarrow CaSO_4 \cdot \frac{1}{2}H_2O + 1\frac{1}{2}H_2O$.

This chemical reaction indicates that calcium sulfate dihydrate plus heat yields calcium sulfate hemihydrate plus water vapor. This process is conducted in a "calciner," several types of which are known in the art (e.g., a calcidyne calciner). A flash calcination impact mill is an apparatus for simultaneously drying, grinding, and calcining gypsum.

Calcined gypsum, or stucco, has the valuable property of being chemically reactive with water, and will "set" rather quickly when the two are mixed together. This setting reaction is a reverse of the chemical reaction that occurs during calcination:

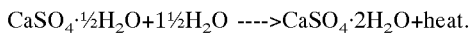
$CaSO_4 \cdot \frac{1}{2}H_2O + 1\frac{1}{2}H_2O \longrightarrow CaSO_4 \cdot 2H_2O + \text{heat}$.

In this reaction, the calcium sulfate hemihydrate is rehydrated to its dihydrate state over a fairly short period of time. Consequently, stucco is useful for numerous applications, including use as a major ingredient of gypsum wallboard core and plaster-based products. Generally, gypsum wallboard is produced by enclosing a core containing an aqueous slurry of calcium sulfate hemihydrate (calcined gypsum) between two large sheets of board cover paper. Gypsum wallboard is typically manufactured commercially by processes that are capable of continuous operation at high-speed conditions, wherein the aqueous slurry of calcined gypsum and other ingredients are continuously deposited to form a core between two continuously-supplied moving sheets of cover paper. The calcined gypsum forming the core between the two cover sheets is then allowed to set, and the continuously-produced board may then be cut into panels of any desired length. The boards are then passed through a drying kiln in which excess water is removed and the gypsum is brought to a dry state. After the core has set and is dried, the product becomes a strong, rigid, fire-resistant gypsum wallboard (also known as drywall or gypsum board).

Prior art methods and apparatus for calcining gypsum have been optimized for use of either natural gypsum or synthetic gypsum, but not both. This is due, in part, to the differing handling characteristics of synthetic and natural gypsum. Calcining natural gypsum in a flash calcining impact mill, for example, typically requires a crushing step to break up the rocks into smaller particles prior to introducing the natural gypsum into the impact mill. Screw conveyors are effective in transporting natural gypsum, but these conveyors typically are not used for synthetic gypsum, because the synthetic gypsum tends to plug up screw conveyors due to its high water content and granular consistency.

The quality of calcined gypsum produced during a calcining process refers to the proportion of calcined gypsum (calcium sulfate hemihydrate) produced. Ideally, the gypsum is completely converted to stucco, with no gypsum or anhydrite mixed with the calcined gypsum. Typically, the product of a calcination process may include less than about 1% uncalcined gypsum, and from about 2% to about 4% soluble anhydrite. Minimizing the amount of gypsum (calcium sulfate dihydrate) and anhydrite produced during calcination results in higher quality calcined gypsum. Gypsum mixed with the calcined gypsum can act as an uncontrolled accelerator for the setting reaction, which can reduce the core strength of gypsum boards. Soluble anhydrite mixed with the calcined gypsum causes a temperature spike during setting, which may require the use of excess set-control agents to control setting time. Furthermore, insoluble anhydrite mixed with the calcined gypsum is inert; it will not convert to the dihydrate form in a reasonable amount of time. Accordingly, the insoluble anhydrite does not contribute to board strength.

In operating a flash calcining impact mill, a feed bin is used to supply gypsum to the impact mill. Typically, vibratory bin discharge equipment, combined with a rotary valve, is used to remove gypsum from the feed bin. For natural gypsum, or synthetic gypsum that has been pre-dried, a screw conveyor running at a constant speed typically is used to transport gypsum to the impact mill. For wet synthetic gypsum (not pre-dried), a belt conveyor running at a constant speed typically is used to transport the gypsum to the impact mill. Neither of these arrangements is effective in consistently delivering gypsum to the impact mill at a constant rate, particularly if the gypsum feed includes various combinations of natural and synthetic gypsum.

A weigh belt is a device including a variable-speed conveyor belt used for delivering materials at a constant rate.

A weigh belt may be combined with a chute having a level sensor for keeping a fixed amount of material at an input end of the weigh belt. However, weigh belts have not been used to supply gypsum to an impact mill, and the applicants have found that a level-sensing device is not effective in controlling the amount of gypsum in a chute supplying a weigh belt, particularly when using synthetic gypsum, or combinations of synthetic and natural gypsum. When using synthetic gypsum the applicants found that level sensors frequently malfunction, which causes the chute to run low or out of gypsum feed, and which results in variations in the quality of calcined gypsum produced by the impact mill. Moreover, the applicants found that vibratory bin discharge equipment, combined with a rotary valve, is not effective for consistently removing gypsum from a feed bin, particularly when using synthetic gypsum. There is a need for improved methods and combinations of process equipment for a continuous calcination process that are effective for use with natural gypsum, synthetic gypsum, or any combination thereof, and that result in high-quality calcined gypsum product, regardless of which sources of gypsum are used.

SUMMARY OF THE INVENTION

According to one aspect of the present invention, an apparatus for continuously calcining gypsum includes a flash calcining impact mill, a feed bin adjacent the impact mill for holding gypsum, and a gypsum feed control mechanism for supplying gypsum from the feed bin to the impact mill at a substantially constant rate. The gypsum feed control mechanism includes a conveyor belt and a load cell for sensing the amount of gypsum disposed on the conveyor belt.

According to another aspect of the present invention, a method for continuously producing calcined gypsum includes the steps of providing a flash calcining impact mill and providing a feed bin adjacent the impact mill, the feed bin containing gypsum to be calcined. A gypsum feed control mechanism is provided for supplying gypsum from the feed bin to the impact mill. Gypsum is supplied from the feed bin to the impact mill at a substantially constant rate, and the impact mill is operated to dry, grind, and calcine the gypsum.

BRIEF DESCRIPTION OF THE DRAWINGS

The FIGURE is a schematic view of an apparatus of the present invention for continuously calcining gypsum.

DETAILED DESCRIPTION OF PREFERRED EMBODIMENTS

As shown in the FIGURE, an apparatus or system 10 for continuously calcining gypsum includes a surge silo 12 for storing a mixture 14 of natural gypsum and synthetic gypsum to be calcined. The surge silo 12 typically has a capacity of about 300 tons (about 272 metric tons). The mixture 14 may include 100% natural gypsum, 100% synthetic gypsum, or any combination of natural and synthetic gypsum. The synthetic gypsum that may be supplied to the apparatus 10 can be FGD gypsum, titanogypsum, phosphogypsum, fluorogypsum, citrogypsum, borogypsum, or any combination thereof, for example. A raw material transfer conveyor 16 is used to supply the gypsum mixture 14 to the surge silo 12. The raw material transfer conveyor 16 may be a high angle conveyor (such as a Loop Belt Elevator supplied by Stephens-Adamson Canada of Belleville, Ontario).

Prior to supplying the gypsum mixture 14 to the conveyor 16, natural gypsum is crushed in a hammermill (not shown) such as a Williams Reversible Impactor (supplied by the Williams Patent Crusher & Pulverizer Co. of St. Louis, Mo.). Such a hammermill typically reduces the size of gypsum rocks from a diameter of about 6 inches (about 15 cm) to a diameter of about 2 inches (about 5.1 cm) or less (in any one dimension). Synthetic gypsum in the mixture 14 generally does not need to be crushed in the hammermill, but typically is mechanically de-watered to a free water content of about 6% to about 12% free water. Pre-drying of the synthetic gypsum is not required. Natural gypsum typically includes from about 1% to about 3% free water.

Gypsum is removed from the surge silo 12 by a silo discharge machine 18, which may be a rotary-plow discharger, such as a Louise Silo Discharger model Centrex 2000 (supplied by LOUISE Fördertechnik GmbH & Co.). The discharger 18 supplies the gypsum 14 to a conveyor 19, which may be a high angle type conveyor (such as a Loop Belt Elevator supplied by Stephens-Adamson Canada of Belleville, Ontario). From the conveyor 19, the gypsum 14 is moved by another conveyor (not shown), such as a chain conveyor. The chain conveyor is preferably a drag chain style (such as an Enmasse conveyor supplied by Svedala Bulk Materials Handling division of Stephens Adamson of Pittsburgh, Pa.), with drag bars located at approximately 12-inch intervals, riding in a rectangular-type trough. The trough is preferably lined with a high-density plastic material, such as ultrahigh molecular weight (UHMW) polyethylene (e.g., TIVAR-88 UHMW sheets distributed by the Poly Hi Solidur division of Menasha Corporation, Fort Wayne, Ind.), which prevents the gypsum 14 from sticking and building up on the conveyor, particular when conveying synthetic gypsum. The chain conveyor supplies one or more feed bins 20, each having a capacity of between about 10 tons and about 15 tons (about 9.1 metric tons to about 13.6 metric tons), and providing gypsum 14 for a particular continuous calcination apparatus, preferably a flash calcining impact mill 22. For simplicity, FIG. 1 shows only a single feed bin 20 and impact mill 22, although the apparatus 10 preferably includes a plurality of impact mills, such as four impact mills, each coupled with a particular feed bin 20. The apparatus 10 also preferably includes recirculation conveyors (not shown) for returning excess gypsum 14 from the feed bins 20 to the surge silo 12.

The apparatus 10 includes a gypsum feed control mechanism, indicated generally at 23, for supplying gypsum 14 from the feed bin 20 to the impact mill 22 at a substantially constant rate. The gypsum feed control mechanism 23 includes a bin discharger 24 for removing gypsum 14 from the feed bin 20 to supply the corresponding impact mill 22. The bin discharger 24 is preferably a rotary-plow type discharger similar to the discharger 18 for the surge silo. Gypsum 14 flows from the bin discharger 24 into a chute 26, which supplies gypsum 14 to an input end 28 of a weigh belt 30 (also part of the gypsum feed control mechanism 23), which transfers the gypsum 14 to the impact mill 22.

The weigh belt 30 includes a variable-speed conveyor belt 32 that is controllable to deliver material at a set rate (e.g., in tons per hour) (such as a Model 10-30-1 or Model 10-251 Belt Scale System supplied by Ramsey Technology, Inc. of Minneapolis, Minn.). The weigh belt 30 includes a load cell 34 for sensing the amount of material (gypsum 14) disposed on the conveyor belt 32. Preferably, the load cell 34 weighs the gypsum on the belt 32 to an accuracy within about 0.5% of its actual weight. The weigh belt includes a variable-speed motor 36, which controls the speed at which the conveyor 32 moves, and thus controls the rate at which gypsum 14 is provided by the belt 32 and thereby supplied to the impact mill 22. The weigh belt includes an input device (e.g., a computer terminal, not shown) for entering a target rate of gypsum supply. Typically, the target supply rate for each impact mill is between about 24 tons per hour and about 30 tons per hour (about 21.8 metric tons/hour (MT/hour) to about 27.2 MT/hour), and more preferably between about 26 tons per hour and about 28 tons per hour (about 23.6 MT/hour to about 25.4 MT/hour). The weigh belt automatically adjusts the rate at which the motor 36 operates, which controls the speed at which the conveyor 32 operates and the rate at which gypsum 14 is supplied, in order to deliver gypsum at an actual rate as close as possible to the target rate. Preferably, the actual rate of gypsum delivery is within 5% of the target. More preferably, the actual rate is within 0.5% of the target.

The chute 26 typically holds about 200 lbs. to about 300 lbs. (about 91 kg to about 136 kg) of gypsum 14 at the input end 28 of the weigh belt 30. A preweigh load cell 38 measures the weight of gypsum disposed in the chute 26, at the input end 28. Similarly to the operation of the load cell 34 in the weigh belt 30, the weight measurement made by the preweigh load cell 38 is used to control the rate of operation of the bin discharger 24, in order to keep a constant supply of gypsum disposed in the chute 26, at the input end 28 of the weigh belt. Preferably, the weight of gypsum at the input end 28 is kept within about 5.0% of a target value. More preferably, the weight of gypsum at the input end 28 is kept within about 0.5 % of a target value. The rate at which gypsum 14 is transferred from the chute 26 to the weigh belt 30 is also controlled by a screed plate (not shown), which controls the height of the gypsum 14 moved out of the chute 26 by the weigh belt 30.

The weigh belt 30 preferably supplies gypsum 14 to the impact mill 22 at a substantially constant rate. The impact mill can be a model No. 83 Imp Mill (supplied by ABB Raymond, a division of Combustion Engineering Company, Lisle, Ill.). The impact mill 22 includes a gas/oil fired burner as a heat source (not shown) and a grinding chamber (not shown). A main circulating fan 60 located upstream of the impact mill 22 carries dried, ground, and calcined gypsum 62 out of the grinding chamber. Gypsum 14 moves through the impact mill 22 very rapidly, becoming dried, ground, and calcined in only a few seconds.

As is know in the art, the impact mill grinding chamber includes a hammermill, which has a series of metal hammers attached to a rotating wheel (rotor) located inside the grinding chamber. The action of the hammers in the grinding chamber reduces the particle size of the gypsum feed 14, which typically includes particles having a diameter of about 2 inches (about 5.1 cm) or less (in any one dimension), to a desired particle size, typically between about 8 microns and about 30 microns. The particle size and distribution is controlled by the number and placement of hammers on the rotor. The material selected for the fabrication of the hammers affects how frequently the hammers will need to be replaced (hammer life). Preferably, the hammers are made of abrasion-resistant steel, such as AR plate steel (e.g., AR400 or AR500 plate steel). The source and composition of the gypsum mixture 14 also affects the hammer life, due to the amount and type of impurities contained in the gypsum 14. Impurities having a hardness greater than 2.0 on the Mohr hardness scale (the hardness of gypsum), such as feldspar or silica, cause increased hammer wear.

The air flow caused by the main fan 60 pulls the calcined gypsum 62 up and out of the impact mill 22, in the direction indicated by arrow 64, into a classifier unit 66, which includes a series of classifying veins (not shown) for separating larger particles from those falling within the desired particle size range. The larger particles are returned to the impact mill 22 through a return pipe 68, in the direction indicated by arrow 69, which allows the larger particles to go back into the impact mill 22 for further processing along with the gypsum 14 supplied by the weigh belt 30.

Calcined gypsum is moved out of the classifier by the air flow caused by the fan 60, in the direction indicated by arrow 70, and into a cyclone collector 72. The cyclone collector separates out the majority of the calcined gypsum product 74 (typically about 95%) and deposits the calcined gypsum 74 in a product conveyor 76, which is typically a screw conveyor. At the upper end 78 of the cyclone collector 72, hot air, moisture from calcination, and ultra fine particles 80 of calcined gypsum are discharged in the direction indicated by arrow 82, and move by the fan 60 into a dust collector unit 84. The dust collector 84 separates out the ultra fine particles 80 from the air stream, and the particles 80 are deposited on the product conveyor 76. Most of the clean air is then exhausted to the atmosphere at a vent 86, and a portion of the clean air is returned to the burner, via air return time 88.

A vent temperature sensor (not shown) measures the temperature of the air exhausted at the vent 86. As is known in the art, maintaining a consistent vent temperature is desirable in operating the impact mill, because a consistent vent temperature generally indicates a consistent degree of calcination of the gypsum. A target value for the vent temperature is selected so that the calcined gypsum produced by the impact mill is of a high quality, i.e., so that the required amount of water is driven off to completely convert the gypsum to stucco, and to minimize the amount of uncalcined and anhydrous gypsum mixed with the stucco. The vent temperature and moisture content of the product are related in that a higher vent temperature results in a lower moisture content. (Likewise, a lower vent temperature results in a higher moisture content.) The target temperature may be selected so that the product contains about from about 0.5% to about 1% below the theoretical percentage of water if the gypsum is completely converted to stucco. For 100% pure gypsum, completely converted to 100% pure stucco, the stucco contains about 6.2% water. Typically, the gypsum has a purity of about 88% to 96%, and the stucco produced will have a theoretical water content of less than 6.2%. Controlling the vent temperature to produce product with less than the theoretical percentage for complete conversion to stucco is desirable to avoid having uncalcined gypsum mixed with the stucco product. Too low of a moisture level, however, will result in an increased amount of soluble anhydrite mixed with the stucco. During operation of the impact mill 22, the stucco product 74, 80 is sampled at regular intervals (e.g., every two hours) and its moisture content is analyzed. Adjustments are made to the target vent temperature, as necessary, to insure that the product contains the desired moisture content.

Typically, the target vent temperature is set to a value between about 149° C. and about 168° C., more preferably between about 154° C. and about 160° C. The impact mill 22 automatically changes the inlet temperature of air being drawn into the mill 22, in order to maintain the vent temperature as close as possible to the target temperature. If the gypsum mixture 14 contains a high percentage of free water, then a higher inlet temperature is generally required to reach a particular vent temperature, and to produce the same degree of calcination. As is known in the art, the inlet temperature is controlled by adjusting the rate at which the impact mill burner operates.

In operating the continuous calcination apparatus 10, the surge silo 12 may be filled with 100% natural gypsum, 100% synthetic gypsum, or any combination thereof. The combination of equipment comprising the apparatus 10 is unique in that it can produce high-quality calcined gypsum from a wide variety of gypsum mixtures 14. The apparatus 10 differs from prior continuous calcination equipment in a number of ways. In particular, the apparatus includes a unique gypsum feed control mechanism 23 for supplying gypsum to the impact mill 22 at a constant rate. In prior systems, typically a screw-type conveyor set to a constant speed is used to supply gypsum to an impact mill, rather than a variable-speed weigh belt 30 as included in the gypsum feed control mechanism 23. Moreover, the applicants have discovered that the weigh belt 30 operates much more effectively when it is combined with a variable speed bin discharger 24, whose rate of operation is controlled based on output from a load cell 38, which measures the amount of gypsum delivered to the weigh belt.

To control the operation of the equipment in the continuous calcination apparatus 10, a programmable logic control computer (PLC) (not shown) is used. For example, an Allen-Bradley PLC5, model 504 (supplied by Allen-Bradley Company of Milwaukee, Wis., a division of Rockwell, International Corporation of Costa Mesa, Calif.) may be used. As is known in the art, a PLC is used to control and coordinate the operation of each piece of equipment in a manufacturing line or system, such at the continuous calcination apparatus 10. The PLC is programmed, according to methods known to those skilled in the art, to coordinate and control the operation of the apparatus 10, including the silo discharger 18, conveyors including the conveyor 19 and recirculation conveyors, the bin discharger 24, and the weigh belt 30. (However, the weigh belt 30 includes a separate programmable controller for controlling the rate at which gypsum is supplied to the impact mill 22.) The PLC also controls the operation of the impact mill 22, including regulating the burner operation to maintain the vent temperature as close as possible to the target vent temperature. The PLC also controls the classifier 66, fan 60, dust collector 84, and screw conveyor 76.

The table below summarizes examples of natural gypsum, synthetic gypsum, and a mixture of natural and synthetic gypsum that have been calcined according to the invention, producing a high quality stucco product that includes a minimal amount of uncalcined gypsum and soluble anhydrite (the amount of soluble anhydrite was measured only for the 100% natural gypsum example).

EXAMPLES

| Example No. | % Natural Gypsum | % Synthetic Gypsum | Type Synthetic Gypsum | % Uncalcined Gypsum | % Soluble Anhydrite |
|---|---|---|---|---|---|
| 1 | 100% | 0% | N/A | 0–0.5% | 2.1–4.0% |
| 2 | 86% | 14% | titanogypsum | 0–0.5% | N/A |
| 3 | 0% | 100% | FGD | 0–0.5% | N/A |

The foregoing detailed description is given for clearness of understanding only, and no unnecessary limitations should be understood therefrom, as modifications within the scope of the invention will be apparent to those skilled in the art.

What is claimed is:

1. A method for continuously producing calcined gypsum comprising the steps of:
   providing a flash calcining impact mill;
   providing a feed bin adjacent the impact mill, the feed bin containing gypsum to be calcined;
   providing a gypsum feed control mechanism for supplying gypsum from the feed bin to the impact mill;
   supplying gypsum from the feed bin to the impact mill at a substantially constant rate; and
   operating the impact mill to dry, grind, and calcine the gypsum supplied to the impact mill.

2. The method of claim 1, wherein the gypsum feed rate is within about 5% of a selected rate.

3. The method of claim 2, wherein the gypsum feed rate is within about 0.5% of the selected rate.

4. The method of claim 1 further comprising:
   providing a weigh belt for supplying gypsum to the impact mill, the weigh belt having a variable speed, the weigh belt including a load cell for sensing the amount of gypsum disposed on the weigh belt; and
   adjusting the weigh belt speed in response to the amount of gypsum sensed by the load cell.

5. The method of claim 4, further comprising:
   providing a bin discharger for removing gypsum from the feed bin and supplying gypsum to an input end of the weigh belt, the bin discharger having a variable rate of operation and including an input end load cell for sensing the amount of gypsum placed in the input end of the weigh belt; and
   adjusting the rate of operation of the bin discharger in response to the amount of gypsum sensed by the input end load cell.

6. The method of claim 1 wherein the gypsum stored in the feed bin comprises a mixture of crushed natural gypsum and synthetic gypsum.

7. The method of claim 6, wherein the synthetic gypsum is selected from FGD gypsum, titanogypsum, phosphogypsum, fluorogypsum, citrogypsum, borogypsum, and combinations thereof.

8. A method for continuously producing calcined gypsum comprising the steps of:
   providing a flash calcining impact mill;
   providing a feed bin adjacent the impact mill, the feed bin containing gypsum to be calcined;
   providing a weigh belt for supplying gypsum to the impact mill, the weigh belt having a variable speed of operation, the weigh belt including a load cell for sensing the amount of gypsum disposed on the weigh belt; and
   providing a bin discharger for removing gypsum from the feed bin and supplying gypsum to an input end of the weigh belt, the bin discharger having a variable rate of operation and including an input end load cell for sensing the amount of gypsum placed in the input end of the weigh belt;
   supplying gypsum from the feed bin to the impact mill at a substantially constant rate by adjusting the rate of operation of the bin discharger in response to the amount of gypsum sensed by the input end load cell and adjusting the weigh belt speed in response to the amount of gypsum sensed by the weigh belt load cell; and
   operating the impact mill to dry, grind, and calcine the gypsum supplied to the impact mill.

9. The method of claim 8 wherein the feed bin contains a mixture of crushed natural gypsum and synthetic gypsum.

10. The method of claim 9, wherein the synthetic gypsum is selected from FGD gypsum, titanogypsum, phosphogypsum, fluorogypsum, citrogypsum, borogypsum, and combinations thereof.

11. An apparatus for continuously calcining gypsum comprising:

a flash calcining impact mill;

a feed bin adjacent the impact mill for holding gypsum;

a gypsum feed control mechanism for supplying gypsum from the feed bin to the impact mill at a substantially constant rate, the gypsum feed control mechanism including a conveyor belt and a load cell for sensing the amount of gypsum disposed on the conveyor belt.

12. The apparatus of claim 11 wherein the gypsum feed control mechanism controls the gypsum feed rate within about 5% of a selected rate.

13. The apparatus of claim 12, wherein the gypsum feed control mechanism controls the gypsum feed rate within about 0.5% of the selected rate.

14. The apparatus of claim 11 wherein the conveyor belt comprises a variable speed weigh belt for supplying gypsum to the impact mill, the weigh belt speed being adjustable in response to the amount of gypsum sensed by the load cell.

15. The apparatus of claim 1 wherein the gypsum feed control mechanism further comprises a bin discharger for removing gypsum from the feed bin and supplying gypsum to an input end of the weigh belt, the bin discharger having a variable rate of operation and including an input end load cell for sensing the amount of gypsum placed on the input end of the weigh belt, the rate of operation of the bin discharger being adjustable in response to the amount of gypsum sensed by the input end load cell.

* * * * *